United States Patent [19]

Cho

[11] Patent Number: 5,016,236
[45] Date of Patent: May 14, 1991

[54] DISC LOADING APPARATUS FOR A VERTICAL TYPE COMPACT DISC PLAYER

[75] Inventor: Eung J. Cho, Kyungki, Rep. of Korea

[73] Assignee: Goldstar Co., Ltd., Seoul, Rep. of Korea

[21] Appl. No.: 413,219

[22] Filed: Sep. 27, 1989

[30] Foreign Application Priority Data

Sep. 30, 1988 [KR] Rep. of Korea ............ 12899/1988

[51] Int. Cl.$^5$ .................... G11B 33/02; G11B 5/016
[52] U.S. Cl. ............................ 369/75.2; 369/75.1; 369/77.1
[58] Field of Search ............... 369/75.1, 75.2, 77.1, 369/77.2, 36, 38; 360/99.02, 99.03, 99.06, 99.07

[56] References Cited

U.S. PATENT DOCUMENTS

| | | | |
|---|---|---|---|
| 4,498,162 | 2/1985 | Schatteman | 369/77.1 |
| 4,523,306 | 6/1985 | Staar | 369/77.1 |
| 4,674,079 | 6/1987 | Agostini | 369/77.1 |
| 4,682,319 | 7/1987 | Einhaus | 369/75.1 X |

FOREIGN PATENT DOCUMENTS

| | | | |
|---|---|---|---|
| 0219980 | 4/1987 | European Pat. Off. | 369/77.1 |
| 0087676 | 5/1984 | Japan | 369/75.1 |

Primary Examiner—Stuart S. Levy
Assistant Examiner—Kenneth B. Wells
Attorney, Agent, or Firm—Birch, Stewart, Kolasch & Birch

[57] ABSTRACT

A disc loading apparatus for a compact disc player capable of loading compatibly the 8 cm compact disc and 12 cm compact disc safely and conveniently without any worry for mistaking to accord the center of disc with that of turn table. The invention is comprised of: right and left side supporting levers fixed by supporting pins to the door for supporting a large-sized or small-sized disc, bracket, elastic bar, slider, sensor lever with sensor pin, turning link, and tension coil spring. According to the invention, compact disc can be loaded very simply and safely regardless of large-sized or small-sized disc, so that the problem of damaging the parts such as turn table or pick up or disc by mistaking to insert the disc, can be excluded, at the same time, reliability of product is improved.

3 Claims, 10 Drawing Sheets

DISC LOADING APPARATUS FOR A VERTICAL TYPE COMPACT DISC PLAYER

BACKGROUND OF THE INVENTION

The present invention relates to a disc loading apparatus for a compact disc player, and more particularly to a disc loading apparatus, by which it is made possible to load compatibly the 8 cm compact disc and 12 cm compact disc safely and easily into a vertical type compact disc player.

Conventionally, such device has been known that disc supporting means which can support compatibly the 8 cm compact disc (hereinafter, refered to as "small-sized disc") and 12 cm compact disc (hereinafter, refered to as "large-sized disc") is arranged within an interior of door which is mounted to open and close pivotally and provided with a clamper so that the small-sized disc and large-sized disc can be respectively placed at the appropriate location.

This conventional disc loading apparatus is of a type, as shown in FIGS. 1 to 4, in which a door 42 is mounted to a body member 41 so that it can be opened or closed pivoting around the hinge shaft 43, a turn table 44 is mounted to the body member 41, a clamper 45 is mounted to the door 42, a disc is placed onto the turn table 44 by the clamper 45, a semicircularly shaped supporting protrusion means 48 abutting and supporting the small-sized disc 47 is formed at the lower portion of clamper 45 in said door 42 and slant surfaces 49 being formed at both end portions thereof, an intermediate supporting protrusion 50 and two supporting protrusion 51, 52 at both sides to be contacted with the large-sized disc 46 are formed at the lower portion of said semi-circularly shaped supporting protrusion means 48, and the bent portions 53, 54 are respectively formed at the tip end portions of both supporting protrusions 51, 52.

Figure 1A:
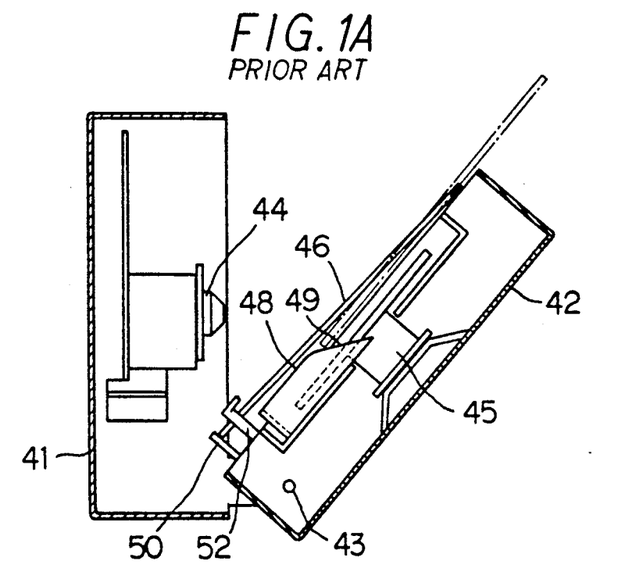
FIGS. 1A and 1B are longitudinal sectional views for the case of loading the large-sized compact discs of the conventional disc loading apparatus at the state that the door is opened o closed respectively.
Figure 1B:
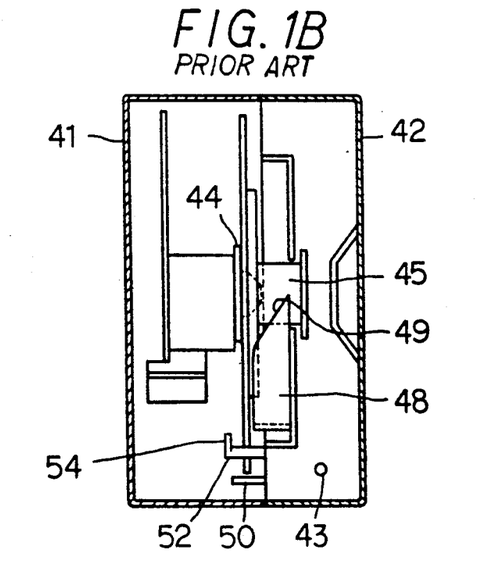
Figure 2:
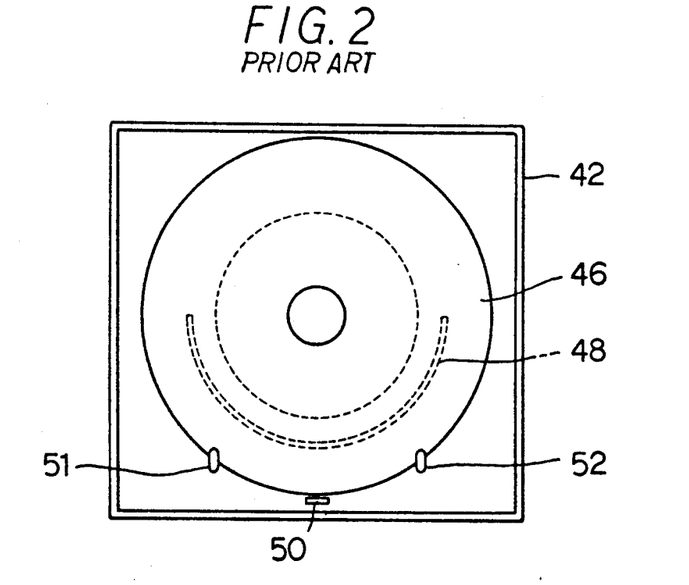
FIG. 2 is a front view showing the door by abstracting it in FIGS. 1.

According to this conventional disc loading apparatus, in a case of loading the large-sized disc 46, as shown in FIG. 1A, when the large-sized disc 46 is put in at a state that the door 42 is opened, since the semi-circularly shaped supporting protrusion means 48 is smaller than the large-sized disc 46 in its diameter, when the large-sized disc 46 is inserted, it is not interrupted by the semi-circularly shaped supporting protrusion means 48 and slipped on the slant surfaces thereof and then abutted and supported to the supporting protrusions 50, 51, 52 at the lower portion, and when the door 42 is closed, as shown in FIG. 1B, at the time that the large-sized disc 46 is abutted and supported, the large-sized disc 46 is safely loaded on the turn table 44 by the clamper 45.

Figure 3A:
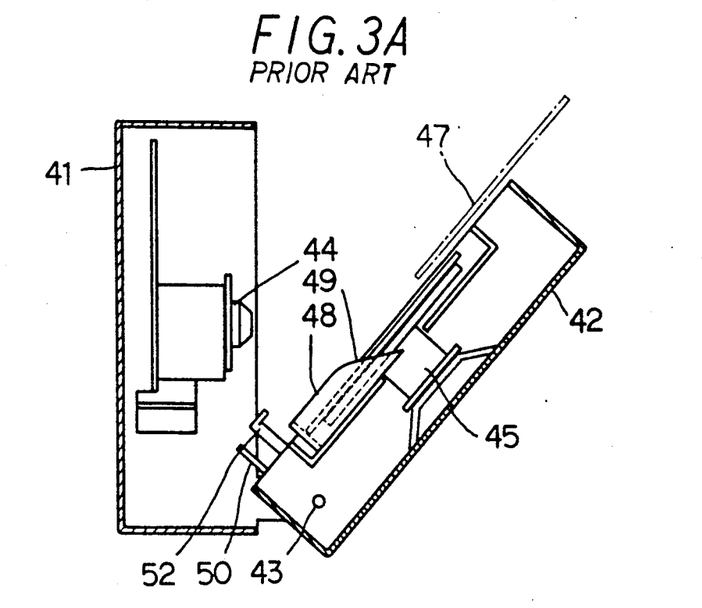
FIGS. 3A and 3B are longitudinal sectional views the case of loading the small-sized compact disc of the conventional disc loading apparatus at the state that the door is opened or closed respectively.
Figure 3B:
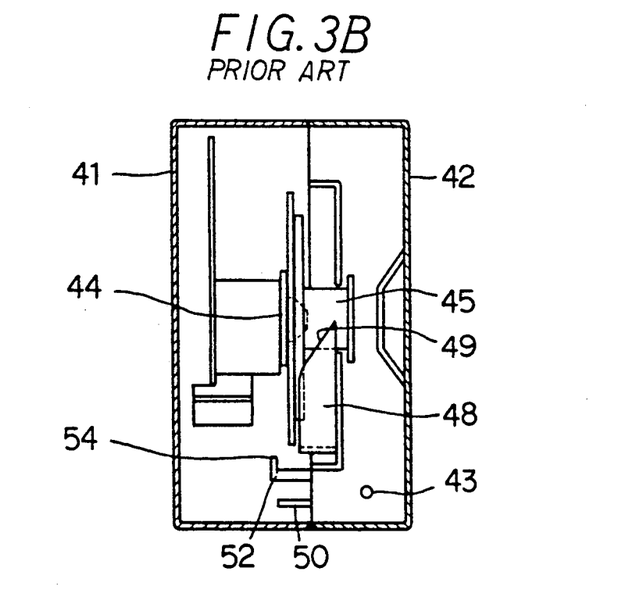
Figure 4:
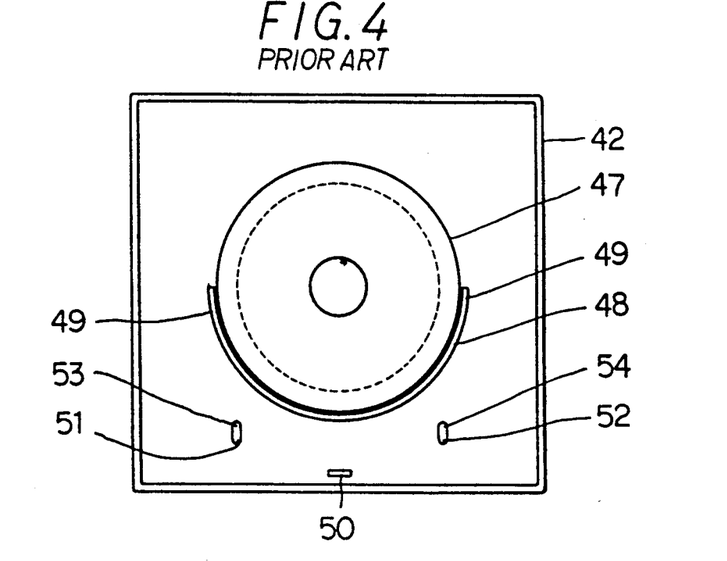
FIG. 4 is a front view showing the door by abstracting it in FIGS. 3A and 3B.

Further, in case of loading the small-sized disc 47, as shown in FIG. 3A, when the small-sized disc 47 is put in at a state that the door 42 is opened, said small-sized disc 47 is sliding down from the inlet and interrupted at the semi-circularly shaped supporting protrusion means 48, at this moment, when the door 42 is closed as shown in FIG. 3B, the small-sized disc 47 is loaded on the turn table 44 by the clamper 45.

In addition, as shown in FIG. 1B and FIG. 3B, in the state that the discs 46, 47 are respectively loaded, since said discs 46, 47 are contacted respectively on the turn table 44 by the clamper 45, and kept respectively to be spaced apart with predetermined distance from the semi-circularly shaped supporting protrusion means 48 and the supporting protrusions 50, 51, 52, any disturbance or interference is not occured when the discs 46, 47 are respectively turned.

However, since the above-described conventional disc loading apparatus requires the small-sized disc or large-sized disc to be loaded carefully so as to be hooked up to the semi-circularly shaped supporting protrusion means 48 or supporting protrusions 50, 51, 52, it has been inconvenient to use, and in case when using the small-sized disc, if it is not laid correctly on the semi-circularly shaped supporting protrusion means, the door becomes to close at a state that the small-sized disc is slipped downward, and therefore there has been the problem that the parts of the turn table and the pick-up are contacted to each other to be damaged and also the information surface of the disc is damaged.

Therefore, according to the conventional disc loading apparatus, at a state that presently the compatible use of the large-sized or small-sized disc is not yet generalized, it has been very difficult to handle safely if user is not skilled.

Further, according to the conventional disc loading apparatus, in case when opening the door after loading and playing the large-sized or small-sized disc, since the large-sized or small-sized disc remains inserted in the interior of the door, there has been also a problem that it is difficult to take out the disc.

On the other hand, in order to solve the problem as aforementioned, apparatus for loading the large-sized or small-sized disc more conveniently, has been offered, for example, a disc loading apparatus of a type which inserts the large-sized and small-sized discs in the same way and supporting by same supporting means in case of loading the large-sized or small-sized disc into the door, and which moves the large-sized or small-sized disc by a position control means and loading safely on the turn table when closing the door. However, although the disc loading apparatus of this type has an object for improving the convenience by rendering possible to load easily the large-sized and small-sized discs in the same method, a apparatus capable of satisfying various points required to the product, i.e., a disc loading apparatus which is simple in structure and the operation is possible to be carried out smoothly has not been developed yet.

SUMMARY OF THE INVENTION

Therefore, it is an object of the present invention to provide a disc loading apparatus capable of loading the small-sized disc and large-sized disc safely and conveniently with a simple structure.

Another object of the present invention is to provide a disc loading apparatus which is used to load large-sized or small-sized disc automatically and safely on the turn table of main body when closing the door by sensing automatically the magnitude of the disc when inserting the large-size or small-sized disc into the door.

Still another object of the present invention is to provide a disc loading apparatus, for easily receiving the large-sized or small-sized disc wherein when opening the door after playing the large-sized disc, the large-sized disc is automatically lifted so that an user can easily take out said disc.

In order to accomplish these objects, a disc loading apparatus according to the present invention comprises right and left side supporting levers having supporting pins for supporting the large-sized or small-sized disc by turning between the upward position and downward position: a bracket for moving linearly within a range of predetermined length so that an elastic bar connected at the lower end portion makes to turn said supporting levers: a turning link for transferring the driving force upon the door opening; a slider for moving linearly said bracket by the turning force of said turning link; a sensor lever for sensing the magnitude of the inserted disc when the large-sized or small-sized disc is inserted, and selectively connected to or separated from said slider so that said bracket is rendered selectively to move; a and tensile coil spring for returning said bracket and sensor lever to original positions.

In the disc loading apparatus of the present invention structured as these, when the large-sized disc is inserted, it is contacted and supported to the supporting pins of the right and left side supporting levers at the same time said sensor lever senses mechanically and the large-sized disc is inserted and coupled to the slider, and then when closing the door, the slider is linearly moved according to the turning link being turned, and the sensor lever and bracket are linearly moved together with that and turning the right and left side supporting levers so that the large-sized disc is moved downward and the center thereof becomes accorded with the turn table of the main body.

Further, in case when inserting the small-sized disc into the door, said small-sized disc is contacted to the supporting pins of the right and left side supporting levers and accorded correctly together with the center of the turn table, and thereafter even if closing the door, only the turning link and slider are moved, and the sensor lever, bracket and the right and left side supporting levers are not moved and maintained in the original state.

That is, as soon as the small-sized disc is inserted into the door, its center becomes accorded together with turn table, and the center of large-sized disc is accorded with the turn table when closing the door after inserting it into the door and that it becomes to be placed safely to the turn table.

In addition, in case of opening the door, it is proceeded in the reverse operation of said operation, and in case of the large-sized disc, it comes to be lifted out of the door by a predetermined length so that it can be taken out easily.

The foregoing and other objects as well as advantages of the present invention will become clear by following description of the invention with reference to the accompanying drawings.

BRIEF DESCRIPTION OF THE DRAWINGS

For a better understanding of the invention, and to show how the same may be carried out into effect, reference will be made, by way of example, with respect to the accompanying drawings, in which.

Throughout the drawings, like reference numerals and symbols are used for designating like or equivalent parts or portions, for simplicity of illustration and explanation.

DETAILED DESCRIPTION OF THE INVENTION

Hereinafter, a preferred embodiment of the present invention as aforementioned will be described in detail with reference to the accompanying drawings.

Figure 5A:
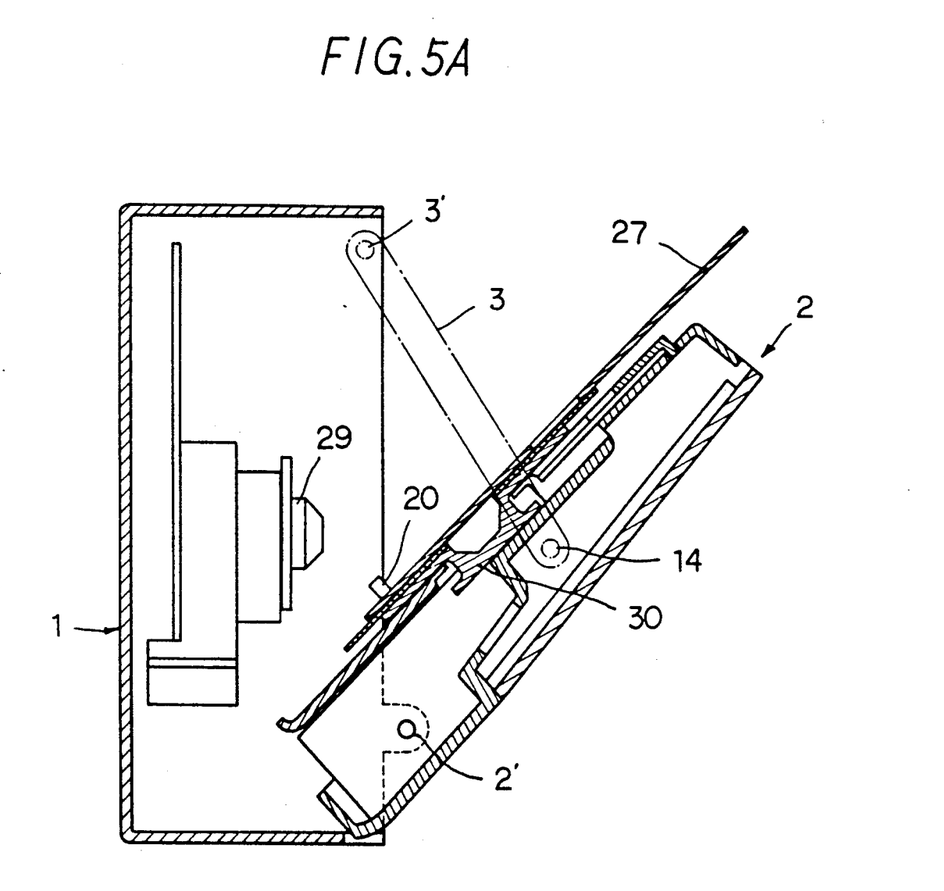
FIGS. 5A and 5B are longitudinal sectional view of the disc containing partly cut away portions showing the case of loading the large-sized compact disc of the present invention at the state that the door is opened or closed respectively.
Figure 6A:
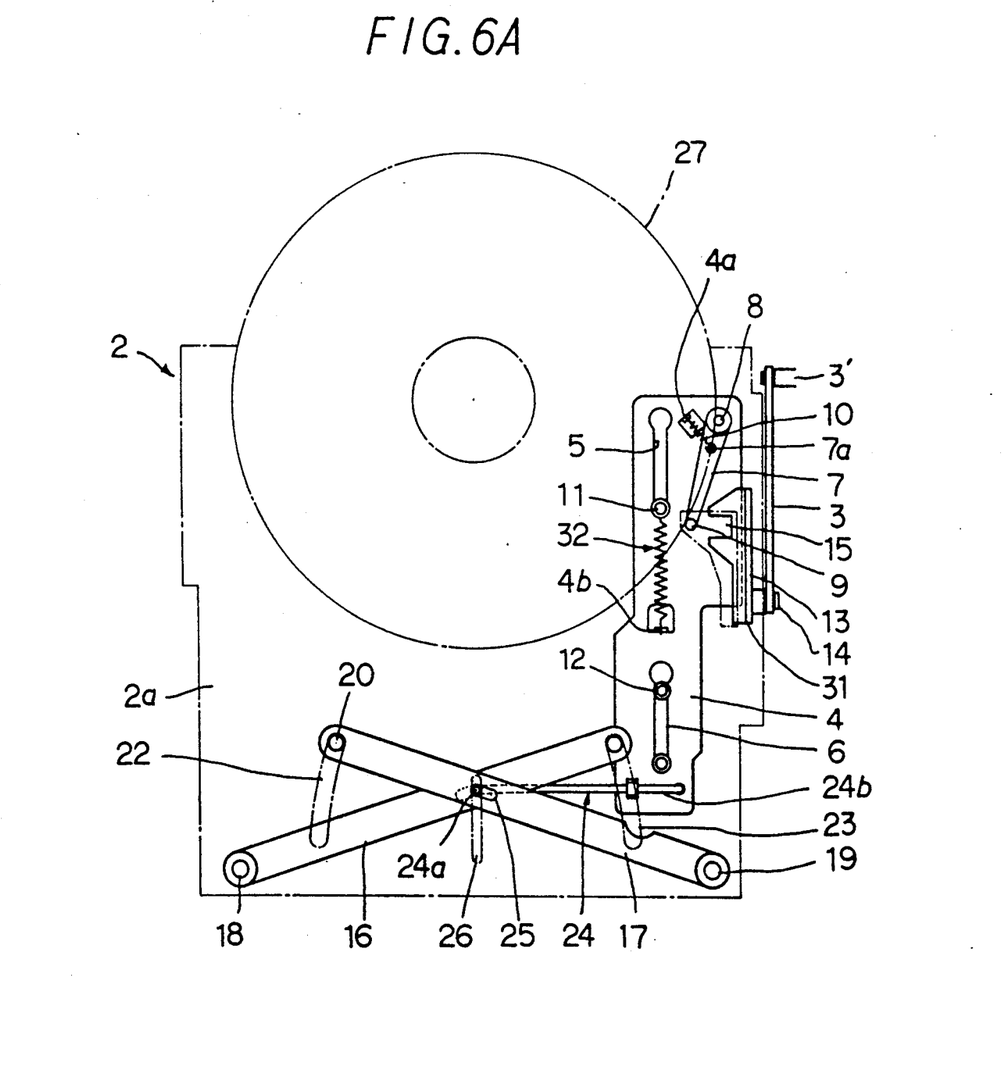
FIGS. 6A and 6B are front views by abstracting the door from FIGS. 5A and 5B, FIGS. 7A and 7B are front views of the case of loading the small-sized compact disc of the present invention at the state that the door is opened or closed respectively.

FIG. 5A is a longitudinal sectional view showing a compact disk player provided with disc loading apparatus according to the present invention in a state of the door being opened, and FIG. 6A is a front view for showing by abstracting the door from FIG. 5A, in which drawings, numeral 1 indicates a main body, numeral 2 indicates a door provided at the main body 1 so as to open and close by turning around hinge 2', and numeral 3 indicates a turning link connected between the main body 1 and door 2.

A bracket 4 is mounted to the internal side of said door 2 so as to slide upward or downward, a sensor lever 7 is pivotally mounted by pivot pin 8 at a side of upper portion of upper surface of said bracket 4, and a sensor pin 9 is fixed at the lower end portion of said sensor lever 7.

Elongated guiding holes 5, 6 are respectively formed longitudinally (vertically in the drawing) at upper and lower portion of said bracket 4. Since guide pins 11, 12 fixed to the interior side of said door 2 are inserted to said elongated guiding holes 5, 6, respectively, they may do linear movement upward or downward.

Figure 6B:
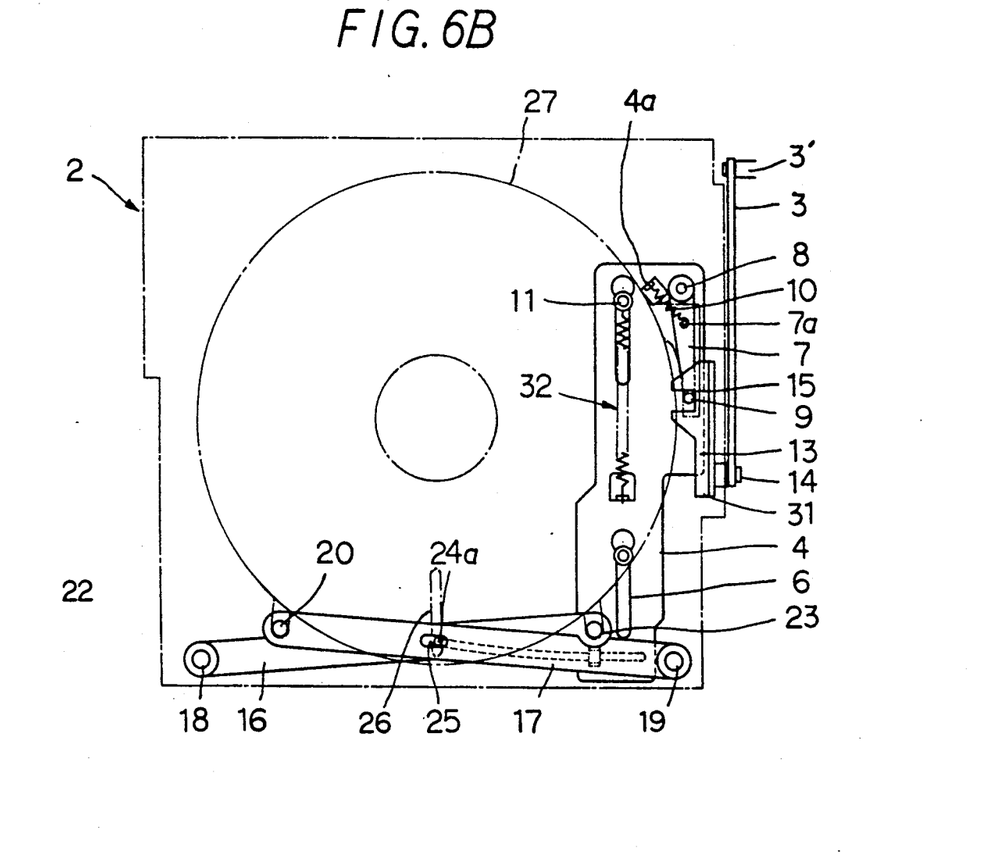

An "L" shaped guiding hole 31 is formed on the internal surface plate 2a of said door 2, and the sensor pin 9 of said sensor lever 7 is projected upwardly through said guiding hole 31, and a tension coil spring 10 for resiliently supporting the sensor lever 7 (FIG. 6) is connected between an upper end fixing portion 4a of said bracket 4 and an intermediate fixing portion 7a of the sensor lever 7. Further, a tension coil spring 32 for urging upwardly said bracket 4 is connected between an intermediate fixing portion 4b of said bracket 4 and the guide pin 11.

A slider 13 is mounted so as to be able to move linearly upward or downward by a predetermined length adjoining with said bracket 4 at said door 2. A hooking groove 15 inserted with the sensor pin 9 of said sensor lever 7 is formed to said slider 13 at its upper end, a lower end of said turning link 3 is pivotally connected with pivot pin 14 at the outside of lower end portion, and an upper end of said turning link 3 is pivotally mounted with pivot pin 3' at the upper side predetermined portion of the main body 1.

It may be any form if a means for guiding said slider 13 to move linearly whose slider 13 is a construction for moving without any interference with other parts.

On the other hand, lower end portions of right and left said supporting levers 16, 17 are pivotally fixed respectively with pivot pins 18, 19 at the both side corners of lower side of interior of said door 2, and crossing each other by X-shape at intermediate portions, and supporting pins 20, 21 are respectively fixed at the upper ends of said right and left side levers 16, 17 and projected through arc-shaped guide holes 22, 23 formed at both sides of lower portion of said door's interior plate 2a (FIGS. 6A, 6B, 7A, and 7B).

Elongated holes 25 are respectively formed at the intermediate portion of said right and left side levers 16, 17, and a vertically elongated hole 26 is formed at the middle portion of lower side of said door's interior plate 2a, and a bent end 24a of one side of resilient bar 24 is projected to the vertically elongated hole 26 of door's interior plate 2a through the elongated holes 25 of the right and left side levers 16, 7, and other end 24b of said resilient bar 24 is firmly fixed at the lower side of said bracket 4

In FIGS. 5A to 8 numeral 27 is a large-sized disc, 28 is a small-sized disc, 29 is a turn table provided at the main body 1, 30 is a disc clamper provided to the door housing 2.

The operation and effect of the disc loading apparatus according to the present invention structured as aforementioned will be described in detail with reference to FIGS. 5A to 8 as follows.

As first, in case when using the large-sized disc 27, as shown in FIG. 5A and FIG. 6A, when inserting the large-sized disc 27 from the upward into the door 2, a part of external circumference of large-sized disc 27 is touched to the sensor pin 9 of the sensor lever 7, and then the sensor lever 7 is turned around the pivot pin 8 in the counterclockwise direction (FIG. 6), at this moment, the tension coil spring 10 is expanded.

Thus, in accordance with the sensor lever 7 being turned, the sensor pin 8 moves from "A" position of the guide hole 31 formed on the door 2 to "B" position (FIG. 8), and inserted into the hooking groove 15 of the slider 13, and the large-sized disc 27 inserted as this is laid on the supporting pins 20, 21 of the right and left side levers 16, 17 at the lower side of its external circumference so that the insertion is completed, at this moment, the center of said large-sized disc 27 is not accorded with the turn table 29 and displaced upward.

When the door 2 is closed in this state, the door 2 is turned around the hinge pin 2'. Accordingly, the turning link 3 is around the pivot pin 3', and the slider 13 connected by pivot pin 14 with lower end of the turning link 3 is moved downward. Thus when the slider 13 is moved downward, since the sensor pin 9 is inserted into its hooking groove 15, the sensor lever 7 also is moved downward, and since the sensor lever 7 is connected by pivot pin 8 with the bracket 4, the bracket 4 also is moved downward, at this moment, the tension coil spring 32 is expanded.

Thus, when the bracket 4 is moved downward, since one end of the elastic bar 24 end is fixed to the lower end thereof is moved simultaneously downward, the elastic bar 24 is pushed each elongated holes 25 of the right and left supporting levers 16, 17 downward, and the right and left supporting levers 16, 17 are turned around the pivot pins 18, 19, respectively, and then the supporting pins 20, 21 fixed to the free ends of the right and left side supporting levers 16, 17 are moved downward by sliding along the arc-shaped guide holes 22, 23 respectively.

Figure 5B:
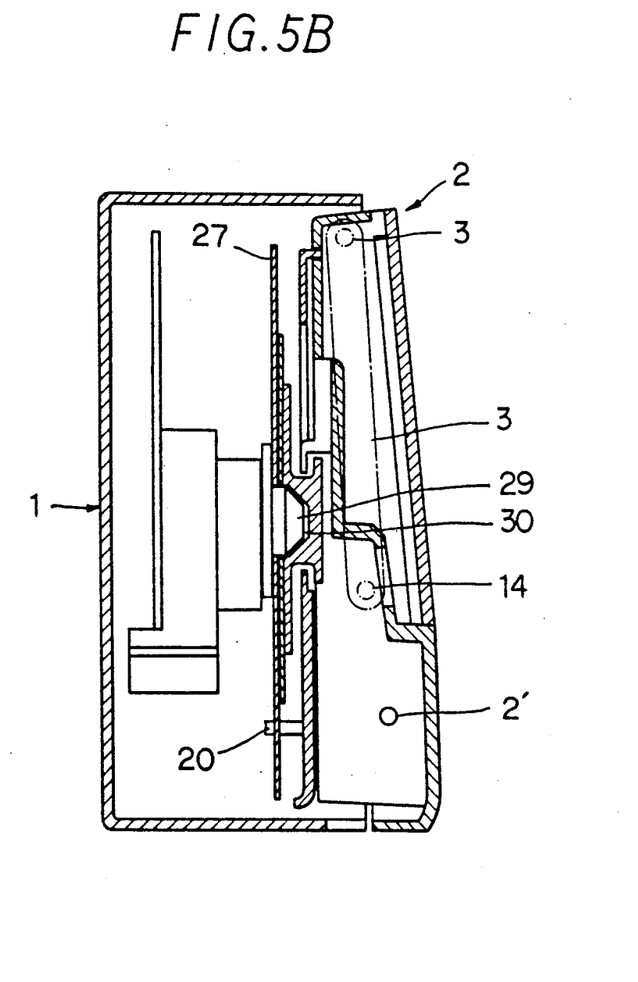

Thus, when the supporting pins 20, 21 of the right and left side supporting levers 16, 17 are moved downward, the large-sized disc 27 laid on the supporting pins 20, 21 is moved downward as shown in FIG. 5B and FIG. 6B, and the large-sized disc 27 is accorded with the center of the turn table 29 for the first time, and the door 2 is completely closed, then the large-sized disc 27 is held stably to the turn table 29 by the clamper 30, in this state, the operation such as playing is carried out. The said elastic bar 24 has a pertinent strength, and absorbs the over stroke in the time of the up or downward movement.

On the contrary to this, in case when opening the door 2, aforementioned operation is proceeded in reverse order, and returned from the state of FIG. 5B and FIG. 6B to the state of FIG. 5A and FIG. 6A. At this moment, since the supporting pins 20, 21 of the right and left side supporting levers 16, 17 are moved upward and the large-sized disc 27 is projected a little more than the door 2, the user can take the large-sized disc 27 and then be able to take out easily.

Thus, when taking out the large-sized disc 27, the external force applied to the sensor pin 9 of the sensor lever 7 is removed, so that the sensor lever 7 is returned from the imaginary line of FIG. 6A to the dot line state by the returning resilient force of the tension coil spring 10, and the sensor pin 9 of the sensor lever 7 becomes drawn out from the hooking groove 15 of the slider 13.

Figure 7A:
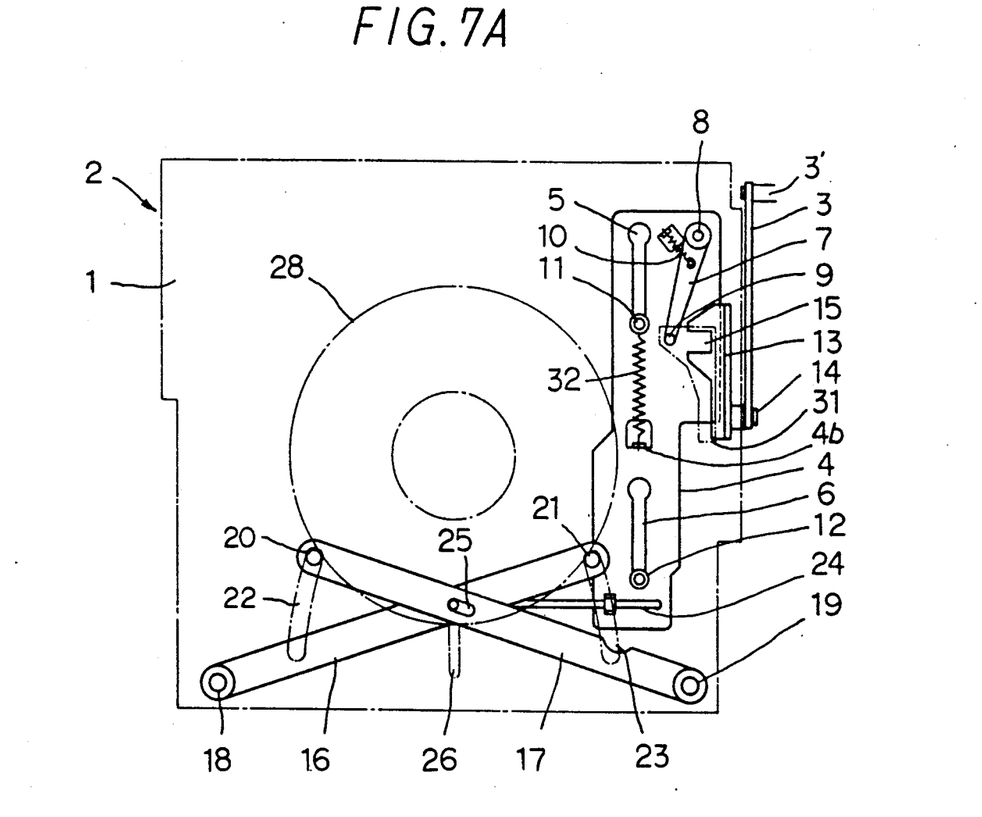

On the other hand, in case when using a small-sized disc, as shown in FIG. 7A, when said small-sized disc 47 is inserted, it is directly laid on the supporting pins 20, 21 of the right and left side supporting levers 16, 17, without contacting with said sensor pin 9 of the sensor lever 7 at the same time, and comes to be positioned at the center position equal to the turn table 29.

Figure 7B:
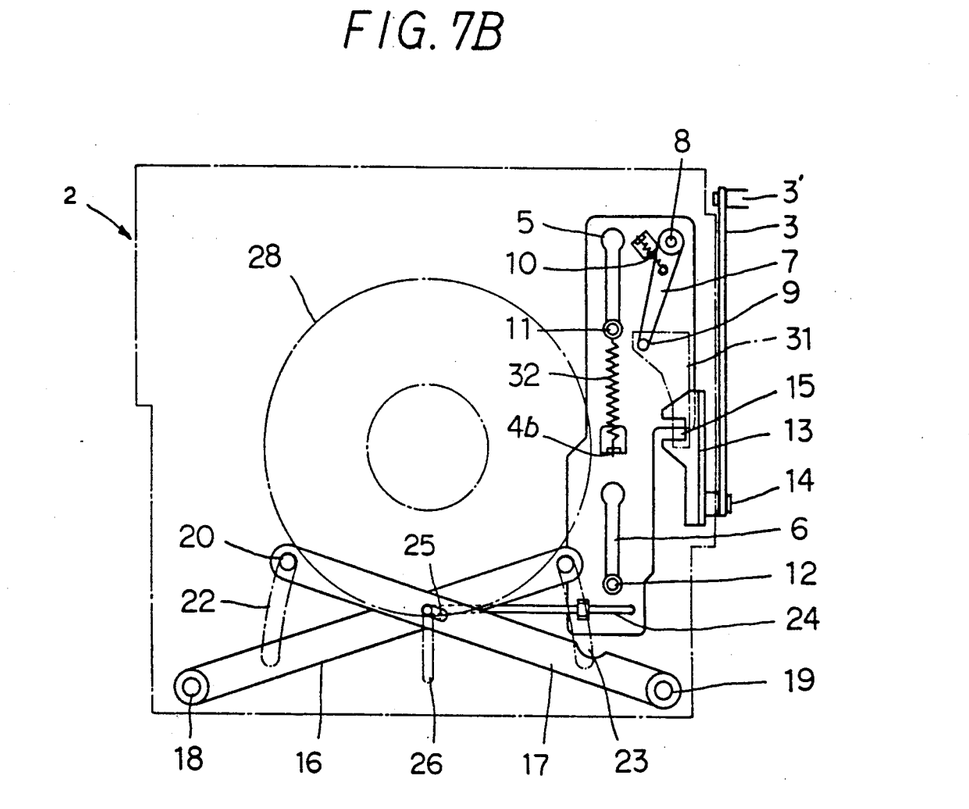
Figure 8:
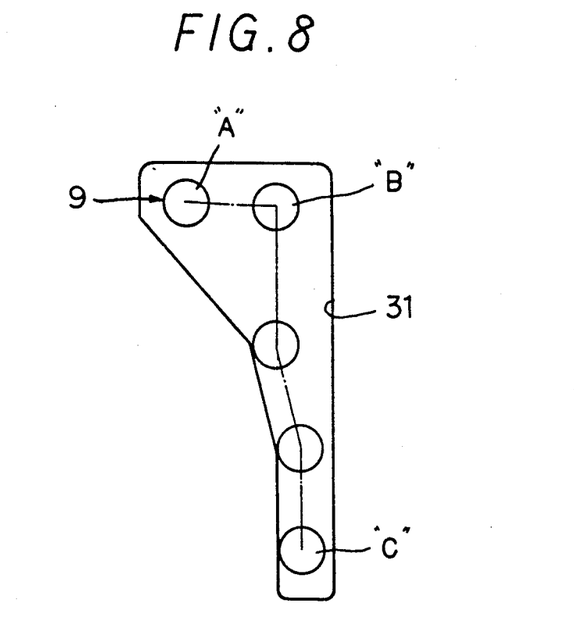
FIG. 8 is a schematic diagram illustrating a relation between the sensor pin of the sensor lever and the guide hole of the internal plate of door.

When closing the door 2 at this state, although the slider 13 is dropped down by the turning link 3 as aforementioned, at this moment, since the sensor pin 9 of the sensor lever 7 is not hooked at the hooking groove 15 of the slider 13, as shown in FIG. 7B, the bracket 4 is not dropped and only slider 13 is dropped. Accordingly, since the right and left side supporting levers 16, 17 are not operated, the supporting pins 20, 21 are also not moved and the small-sized disc 28 is also maintained in original condition. In accordance with the door 2 completely closed, the clamper 30 holds stably the small-sized disc 28, and at this state, the operation such as playing is carried out.

On the contrary, in case when opening the door 2, it is returned from the state of FIG. 7B to FIG. 7A by the reverse operation as aforementioned, at this moment, the user may put a finger into the interior of the door 2 and taking out the small-sized disc 28.

According to the present invention as described above, when either large-sized disc 27 or small-sized disc 28 is inserted in the same manner, since it is contacted and supported to the supporting pins 20, 21 the supporting levers 16, 17 and closing the door 2,it is correctly and safely mounted to the turn table 29 after the door 2 is closed. Therefore, the user can load either the large-sized disc 27 or small-sized disc 28 very conveniently and safely, the problem that the disc and turn table 29 and the like being damaged by mistaking to insert either the large-sized disc 27 or small-sized disc 28 can be excluded, and in case when opening the door 2, since the large-sized disc 27 is projected by a predetermined length more than the door 2, it can be taken out simply and easily.

In addition, according to the present invention, since the disc sensing means and disc position controlling means are structured with very simple cooperating mechanism, the number of parts used are reduced and its structure becomes simple, and there is a advantage that the disc loading operation is smoothly carried out without any interference between each parts.

Therefore, the disc loading apparatus according to the present invention is simple in construction, inexpensive to manufacture, durable in use and refined in appearance.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A disc loading apparatus for a compact disc player, which comprises:

a door housing mounted to a main body of said disc loading apparatus by hinges, said door housing including a L-shaped sensor pin guide channel disposed in the one side thereof, right and left side supporting levers pivotally fixed to lower sides of an interior of said door housing by first pivot pins at lower end portions thereof, respectively, said right and left side supporting levers having an X-shaped cross portion crossed with each other at a middle portion thereof and provided with a pair of supporting pins fixed to an upper end portion thereof, respectively, for passing through a pair of arc channels disposed in the interior of said door housing so as to support a small-sized disc or a large-sized disc and turning along a predetermined angle between a lower position and an upper position of the right and left side supporting levers so as to mate with a center of a turn table of the disc loading apparatus, and means for driving for turning said right and left side supporting levers to lower or upper positions of the right and left side supporting lever, said driving means including:

a bracket vertically, movably mounted to upper and lower guide pins supported on the interior of said door housing at upper and lower vertical guide channels thereof, said bracket provided with a tension coil spring connected to said upper guide pin for maintaining the bracket to be located at an upper position of the door housing, an elastic bar fixed to a lower end portion of said bracket at one end thereof and inserted into an elongated hole of the middle portion of said right and left side supporting levers at a bent portion of the other end thereof;

a slider having a sensor pin guide slot disposed in an upper portion thereof, a turning link pivotally fixed to the upper side portion of said main body at an upper portion thereof by a second pivot pin, and pivotally fixed to said slider at a lower portion thereof by a third pivot pin, and a sensor lever pivotally fixed to an upper end portion of an upper surface of said bracket by a fourth pivot pin at one end thereof, said sensor lever provided with a sensor pin at the other end thereof wherein the sensor pin moves along said L-shaped sensor pin guide channel, whereby the sensor pin detects the insertion of the large-sized disc or the small-sized disc and the large-sized disc and or the small-sized disc are separatively, automatically inserted into the disc loading apparatus and upon opening a door of the door housing, the large-sized disc is automatically lifted from the disc loading apparatus.

2. The disc loading apparatus of claim 1, wherein the large-sized disc is a 8 cm compact disc and the small-sized disc is a 12 cm compact disc.

3. The disc loading apparatus of claim 2, wherein the cross portion is crossed with an end portion of a guide rod passed through the middle portion of said right side supporting lever and an elongated aperture disposed in the middle portion of said left side supporting lever, whereby the end portion of the guide rod mounted to the lower portion of the bracket at the other end of the guide rod is passed through the elongated aperture of the left side supporting lever and a vertical channel of the door housing.

* * * * *